3 Sheets—Sheet 1.

J. H. THOMAS.
Horse Hay-Rake.

No. 223,078. Patented Dec. 30, 1879.

Witnesses
Franck L. Durand
Alex. Mahon

Inventor
John H. Thomas
by A. M. Smith
Attorney

3 Sheets—Sheet 2.

J. H. THOMAS.
Horse Hay-Rake.

No. 223,078. Patented Dec. 30, 1879.

Witnesses.
Franck L. Outland
Alex. Mahon

Inventor
John H. Thomas
by A. M. Smith
Attorney.

N. PETERS, PHOTO-LITHOGRAPHER, WASHINGTON, D C.

3 Sheets—Sheet 3.
J. H. THOMAS.
Horse Hay-Rake.
No. 223,078. Patented Dec. 30, 1879.
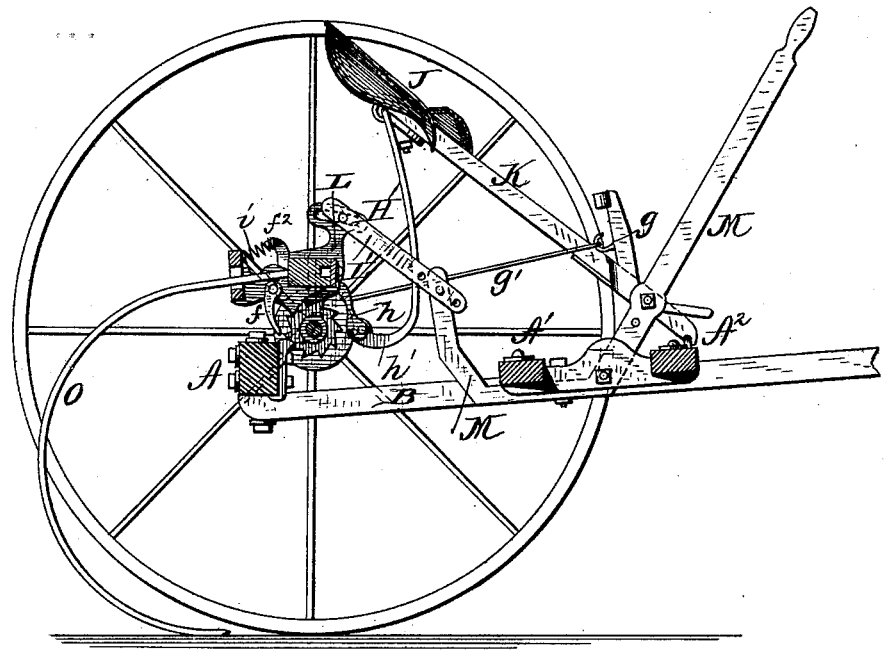
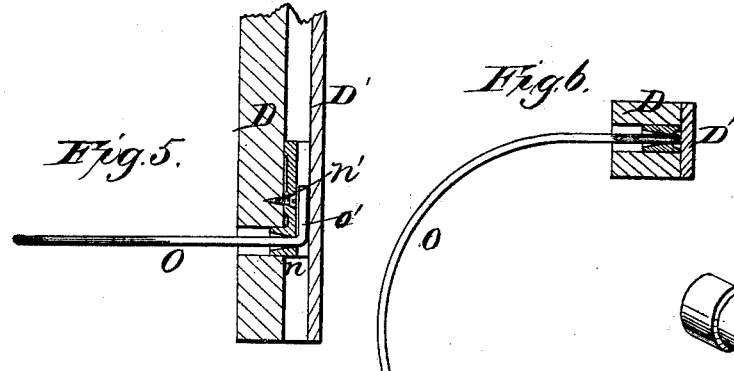
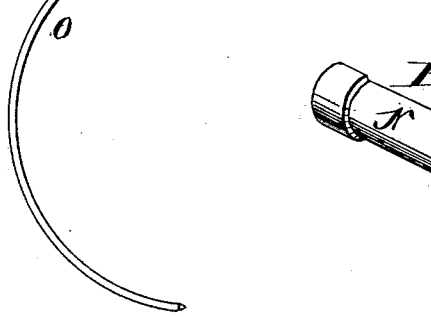
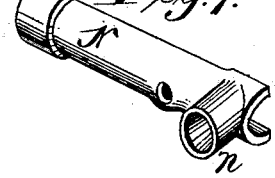
Witnesses
Franck L. Ouland
Alex Mahon
Inventor.
John H. Thomas
by A. M. Smith
Attorney.

UNITED STATES PATENT OFFICE.

JOHN H. THOMAS, OF SPRINGFIELD, OHIO.

IMPROVEMENT IN HORSE HAY-RAKES.

Specification forming part of Letters Patent No. 223,078, dated December 30, 1879; application filed October 16, 1879.

*To all whom it may concern:*

Be it known that I, JOHN H. THOMAS, of Springfield, county of Clarke, State of Ohio, have invented a new and useful Improvement in Horse Hay-Rakes, of which the following is a full, clear, and exact description, reference being had to the accompanying drawings, making part of this specification, in which—

Figure 1:
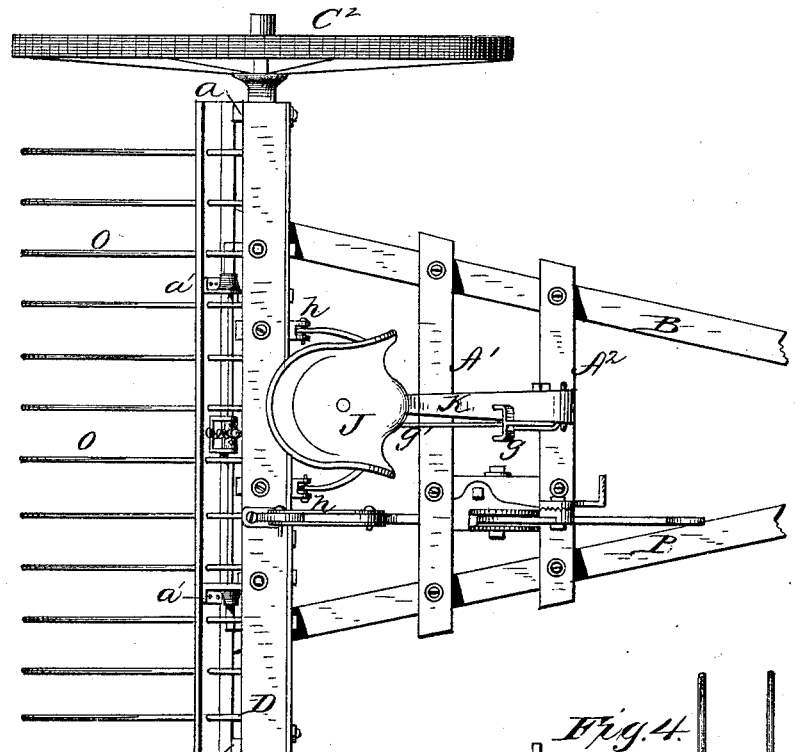
Figure 4:
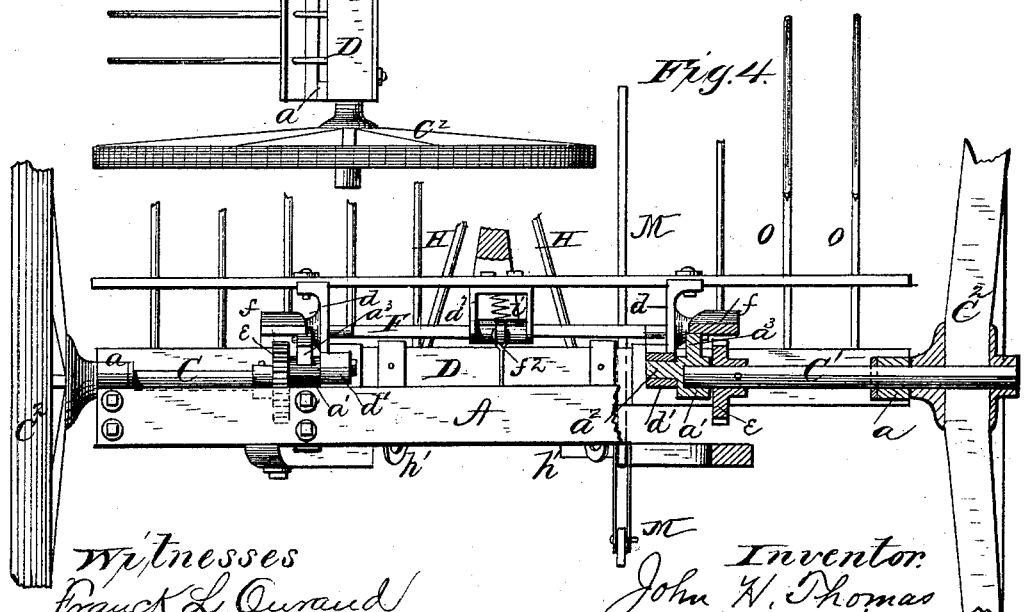
Figure 2:
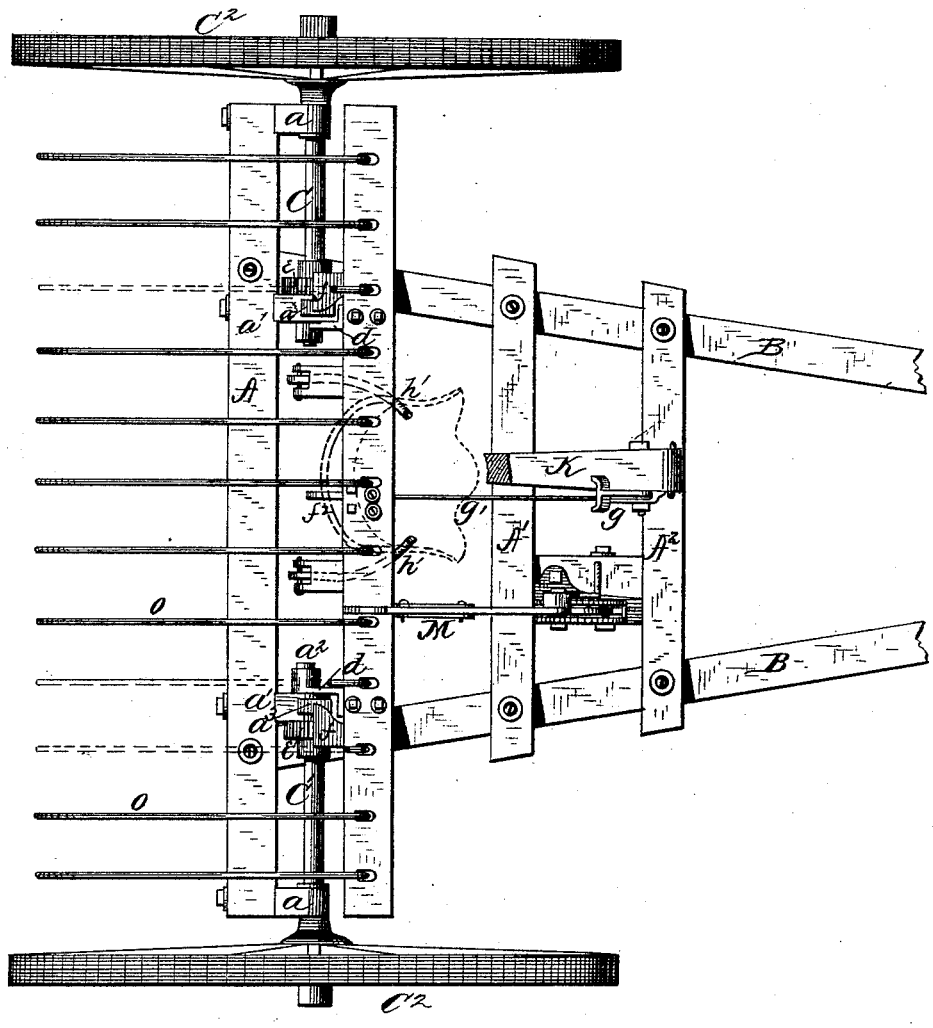

Figure 1 is a plan or top view of my improved rake with the teeth in position for raking or gathering the hay. Fig. 2 is a similar view with the teeth elevated to discharge their load. Fig. 3 represents a vertical longitudinal section through Fig. 1. Fig. 4 is a rear elevation, partly in section, with the teeth thrown up, as in Fig. 2; and Figs. 5, 6, and 7 are detail views, showing the construction of the rake-head and tooth-holder, and the arrangement of the latter and of the teeth relatively to the head, as hereinafter explained.

The invention relates to a novel arrangement of the rocking rake-head relatively to the rotating axle through which power is applied for dumping the rake or causing it to discharge its load; to a novel arrangement of spur or ratchet wheels and pawls for actuating the rake-head and of the inclines for tripping the pawls and releasing the rake when the load has been discharged; and to a novel construction and arrangement of tooth-holder.

In the accompanying drawings, A represents the main frame or axle-bar; B B, the thills or shafts, bolted at their rear ends to the lower face of bar A, and connected in advance thereof by transverse bars A' A², the above parts constituting the main frame of the rake.

To the forward face of bar A are secured brackets $a$ $a'$ $a$ $a'$, arranged in pairs at either end of the bar and provided with bearings for the axles C C', mounted and rotating therein. The axles pass through the brackets $a$, but terminate in the irons or brackets $a'$, the bearings therein being made in cup or socket form, as shown in Fig. 4.

Upon the inner adjacent sides of the brackets $a'$ $a'$, opposite the bearing-sockets, and slightly eccentric thereto and to the axial centers of shafts C C', are short pins or projections $a^2$, formed upon the brackets, and upon which are mounted sleeves $d'$ $d'$, formed upon the lower ends of bracket-irons $d$ $d$, to which the rake-head D is bolted, the brackets $d$ and head D vibrating on the pins $a^2$ as a center. By this arrangement the rake-head is made to vibrate upon a center slightly eccentric to the axial centers of shafts C C', on which the carrying and driving wheels C² C² are secured, and yet sufficiently near to said axial center to maintain a proper working relation of the devices for operating the rake-head from the axle, as hereinafter explained.

While it is preferred to have the bearings or short pins on the bearing-sockets as described, so as to bind the two parts together and avoid yielding, the same result may be accomplished by having the bearings detached from the bearing-sockets and attached to the frame-bar, to which the bearing-sockets or axle-bearings are attached.

The axles C C' have spur or ratchet wheels $e$ $e$ secured to them in close proximity with the bearing-brackets $a'$, and pawls $ff$, attached to a rock-shaft, F, mounted in suitable bearings in the arms or brackets $d$ $d$, and an intermeate bracket, $d^2$, engage with said wheels for rocking the rake-head and raising the rake-teeth. Midway of its length the shaft F has a lever-arm, $f^2$, attached to it, the lower long arm of which is connected by a cord or link, $g'$, with a foot-lever, $g$, arranged in convenient position to be operated by the driver in his seat on the machine. The upper arm of lever $f^2$ has a spring, $i$, connected with it, the tension of which serves to rock said arm and the shaft F forward for holding the pawls out of engagement with the wheels $e$, except when forced in by the attendant.

The axles C C' rotate independently of each other, facilitating the turning of the machine; and to insure the engagement of the pawl with the ratchet-wheel on the more rapidly moving shaft, while permitting the other to back or slip by, the shaft F, in practice, is made by preference of spring-steel, in suitable form to permit one end, with its pawl, to yield, while the other pawl is drawn snugly into engagement with its wheel.

By this arrangement, if one pawl should be caught upon the point or end of one of the spurs or ratchets and fail to act, the other will be drawn into proper engagement with its wheel, and will serve to actuate the rake for dumping its load.

The brackets $a'$ have vertical ribs $a^3$ formed upon them, provided with inclined upper faces, over which the pawls *f* ride as the rake-teeth approach the end of their upward throw, said inclines serving to automatically lift the pawls out of engagement with the wheels *e e*, thereby releasing the rake and permitting it to rock back into working position for gathering a new load. The eccentric movement of the rake-head relatively to the wheels *e* may be made to assist this action of the inclines $a^3$, and thereby facilitate the release of the pawls at the desired point.

To facilitate the dumping of the rake by the power of the team, and to prevent the too sudden descent of the rake-teeth after the load has been discharged, and the jar and digging of the teeth into the ground consequent thereon, the rake-head has arms or brackets *h h* attached to it and projecting downward and forward to a point about in the same horizontal plane with but in advance of the rake-pivot, and to these arms a forked or U (inverted) shaped seat-support, H, has its lower ends pivoted, the upper or loop end of said support being secured in an eye-bearing plate attached to the bottom of seat J and to the upper end of the seat standard or post K. The lower end of the standard K is hinged to the foot-board or transverse bar $A^2$ in such manner as to permit the standard to rock backward and downward.

By this arrangement the weight of the driver, when the rake is in working position, is thrown largely upon the arms *h*, and tends to rock the rake-head, and is thus made to assist the draft of the team in lifting the rake-teeth to cause the discharge of the load.

As the teeth rise the arms *h* rock downward and backward behind the rake-pivot, and their leverage upon the rake-head diminishes to its minimum point, when, the load being discharged and the rake-head released, as the teeth fall back and approach their working position, the leverage exerted by the driver's weight increases constantly until the teeth again reach the ground, thereby breaking the force of their fall and preventing the heavy jar incident to their unresisted descent to the ground. The weight of the driver is thus made to perform the twofold function of assisting the team to discharge the load and easing the fall of the rake when the latter is released from the rotating axles.

The arms of the seat-support H are curved or bent backward and upward at their lower ends, as shown at *h'*, Fig. 3, to permit the described movement of the arms *h* and rake-head.

The rake-head is further connected, through a lever-arm, L, and link L', with the usual bent hand and foot lever M, enabling the attendant to dump the rake by hand, to assist in the dumping of the same by the team, or to hold the rake-teeth down to their work when required.

The rake-head is perforated horizontally at suitable intervals in its length, and has a longitudinal groove formed in its forward face for the reception of a series of tooth-holders, N, (see Figs. 5, 6, and 7,) made semi-cylindrical in form, and provided each, at or near one end, with a short sleeve or eye, *n*, arranged at right angles to the body or shank of the holder, and entering the perforations in the rake-head, as shown.

The perforation through the sleeve *n* expands outwardly from the shank from a diameter near the same as that of the tooth O to a diameter considerably greater than that of said tooth, which passes through it and is bent at a right angle, the elbow or bent end *o'* fitting snugly within the groove in the shank of the holder N, the former acting as a pivot for the rake-tooth and the latter as a bearing therefor, the expanding form of the eye through the sleeve *n* permitting a limited movement or play of the tooth therein.

The holder may be secured in place by screws *n'*, and when in place, with the rake-teeth in position, a plate or bar, D', bolted to the forward face of head D, serves to secure the teeth against displacement and to cover the holders and rake-pivots, as shown.

Parts of the rake not particularly described may be constructed and arranged in any usual or preferred way.

What I claim as new, and desire to secure by Letters Patent, is—

1. In a wheel horse-rake, a rake-head oscillating on a fixed center eccentric to the main drive-wheel axle, but so nearly coincident therewith as not to disarrange the working relation of the pawls engaging with ratchet-wheels on said axle for elevating the rake-teeth.

2. The rake-head arranged to oscillate on a fixed center eccentric to the axle, as described, in combination with pawls and with ratchet-wheels or their equivalent on the axle for raising the teeth by the forward movement of the wheels.

3. The rake-head moving upon a fixed center eccentric to the axle upon which the ratchet-wheels are mounted, in combination with the pawls and the inclined ways or planes for lifting the pawls out of engagement with said wheels when the rake-teeth are at the required elevation for discharging their load.

4. The axle-bearing brackets *a'*, provided with pins or projections forming the pivots or center on which the rake-head oscillates, substantially as described.

5. The combination, with the grooved and perforated rake-head, of the tooth-holders N, having the grooved shank or bearing for the elbow of the tooth and the short sleeve through which the tooth passes, substantially as described.

In testimony whereof I have hereunto set my hand this 13th day of October, A. D. 1879.

JOHN H. THOMAS.

Witnesses:
ROBT. C. RODGERS,
GEO. H. FREY, Jr.